United States Patent [19]

Streck et al.

[11] 4,199,294
[45] Apr. 22, 1980

[54] AUTOMATIC PRODUCTION MACHINE

[75] Inventors: Fritz Streck; Peter Paprotny; Gerhard Bräger, all of Wolfsburg, Fed. Rep. of Germany

[73] Assignee: Volkswagenwerk Aktiengesellschaft, Wolfsburg, Fed. Rep. of Germany

[21] Appl. No.: 810,754

[22] Filed: Jun. 28, 1977

[30] Foreign Application Priority Data

Jul. 9, 1976 [DE] Fed. Rep. of Germany ....... 2630857

[51] Int. Cl.$^2$ ............................................. B65G 47/90
[52] U.S. Cl. .................................... 414/739; 414/686; 414/735; 414/743; 414/744; 414/753; 269/61
[58] Field of Search .................. 269/61; 29/560, 568; 214/1 B, 1 BS, 1 BB, 1 BT, 1 BC, 1 BH, 1 BV, 1 BD, 147 R, 147 G, 147 T, 145 A, 131 A, 130 R, 1 CM, 151; 414/740, 744, 735, 686, 743, 753

[56] References Cited

U.S. PATENT DOCUMENTS

| 1,437,547 | 12/1922 | Pope | 214/147 G |
|---|---|---|---|
| 3,791,052 | 2/1974 | Van Der Lely | 214/131 A X |
| 3,826,383 | 7/1974 | Richter | 214/1 CM X |
| 3,873,148 | 3/1975 | Kennicuit | 214/131 A X |

FOREIGN PATENT DOCUMENTS

| 2452345 | 5/1976 | Fed. Rep. of Germany | 214/1 BD |
| 2537800 | 7/1976 | Fed. Rep. of Germany . | |
| 1121146 | 7/1968 | United Kingdom | 214/131 A |

Primary Examiner—Frank E. Werner
Attorney, Agent, or Firm—Spencer & Kaye

[57] ABSTRACT

An automatic production machine having a headpiece that is adapted to hold a workpiece and/or a work tool and a support for carrying the headpiece. The headpiece and the support are self-contained units which are independent of each other. The support has a mount for supporting the headpiece for pivotal movement with respect to the support about a transverse pivot axis and a drive for pivoting the headpiece when the same is pivotably supported by the support. The headpiece has a mount capable of being pivotably received by the mount of the support and at least one extension which, when the headpiece is pivotably supported by the support, extends into the support and coacts with the drive such that upon actuation of the latter, the headpiece is pivoted about the transverse pivot axis. The connection between the mount on the headpiece and the mount on the support as well as the connection between the extension of the headpiece and the drive of the support are detachable connections and form the sole structural connections between the headpiece and the support. Consequently, the support may be used in conjunction with any one of a plurality of headpieces each of which may, by establishing and breaking the two connections, as required, be interchanged for another headpiece.

4 Claims, 4 Drawing Figures

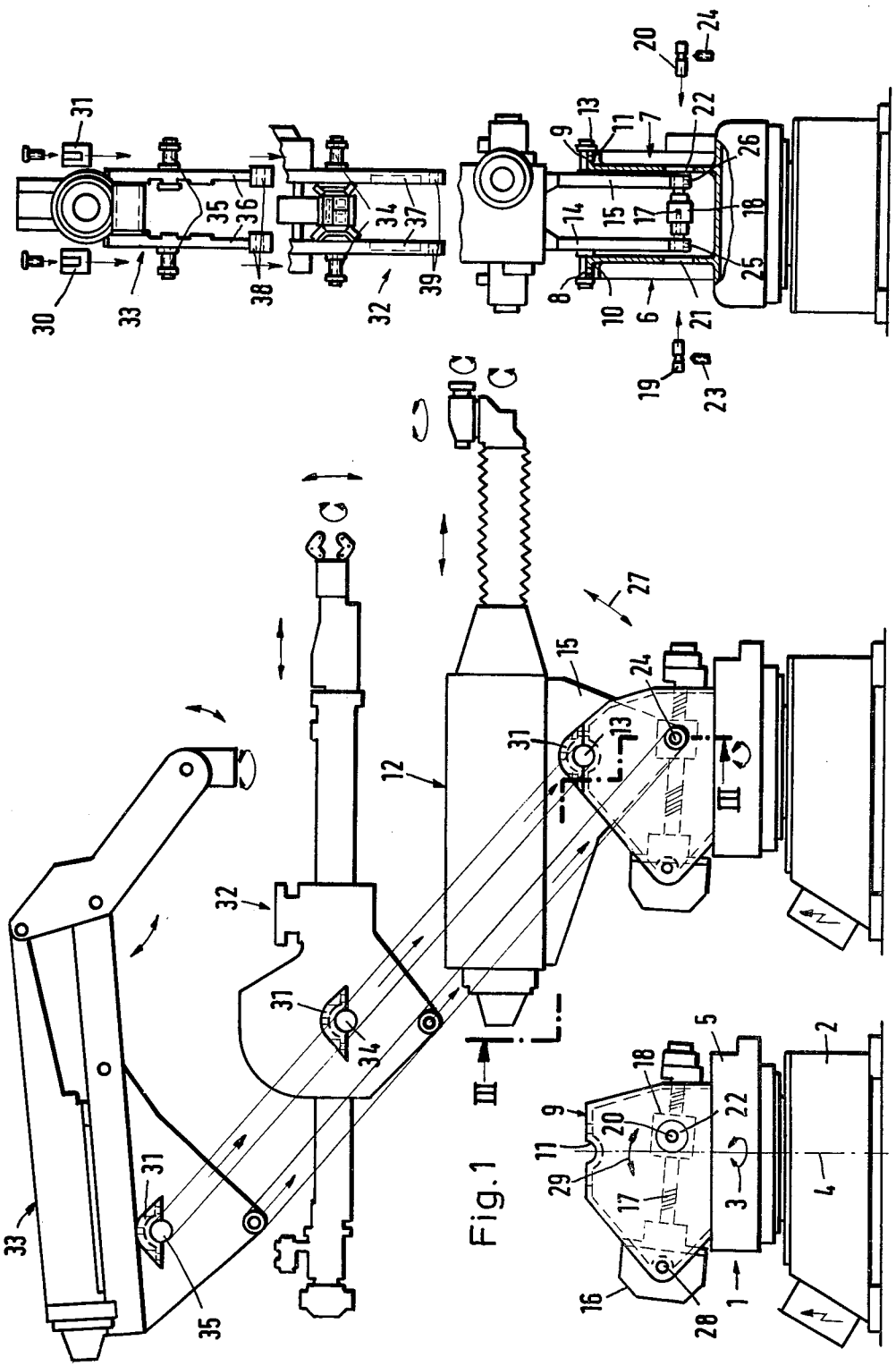

AUTOMATIC PRODUCTION MACHINE

BACKGROUND OF THE INVENTION

The present invention relates to an automatic production machine having a support for carrying a headpiece having a pivot axis which is transverse to the support and which is pivotable by means of a drive mechanism.

More particularly, the present invention relates to an assembly positioner or the like which has an arm-like headpiece which, in a free end region, is adapted to hold a workpiece and/or a work tool.

Assembly positioners of the above type, sometimes referred to as industrial robots, are machines which are used for manipulating work tools as well as for moving workpieces from one work station to another or to or from a work station or to or from storage. The work tools and/or work pieces are usually positioned in accordance with a desired program which, in practice, may be stored on punched tape or other information carrier.

There exist a large number of commercially available automatic production machines of the above type, one example of which can be found in "Industrie-Roboter" (Industrial Robots) by Warnecke and Schraft, 1973, pages 260 and 261, in which reference is made to machinery manufactured by Unimation Inc., Danbury, Conn. If one considers the large number of constructions and modifications of the industrial robots described in the cited text, and those which are on the market, what comes to mind is the fact that there are in fact a great many different types of such machines. A principal reason for this may well be that each industrial robot is developed to carry out a particular function so that the machine must be designed and engineered to meet the requirements of a given industrial application, which in turn will depend on the steps that are to be carried out and on the positions which the workpieces and/or tools will have to occupy. Accordingly, any one industrial robot can be used only in the specific environment for which it was designed, or at best in that and other, closely related environments.

Industrial robots of the above type are, in general, expensive pieces of equipment, requiring substantial capital investment. It therefore appears desirable to provide a way in which to avoid the costs of acquiring new robots whenever a different operation is to be carried out, particularly since any newly acquired machine will, for all practical purposes, itself be limited to carrying out the function for which it was designed, and at best, other functions which are similar to the originally intended function.

SUMMARY OF THE INVENTION

It is, therefore, a basic object of the present invention to provide a way in which to construct automatic production machinery of the above type so as to enable the manufacturer to make maximum use of the complicated and expensive components which are part of such machines.

In accordance with the present invention, this object is accomplished by fashioning the headpiece and the support as self-contained units which are independent of each other, by equipping the support with a mount for supporting the headpiece for pivotal movement with respect to the support about a transverse pivot axis and with a drive for pivoting the headpiece when the same is pivotably supported by the support, by equipping the headpiece with a mount capable of being pivotably received by the mount of the support and with at least one extension which, when the headpiece is pivotably supported by the support, extends into the support and coacts with the drive such that upon actuation of the latter, the headpiece is pivoted about the transverse pivot axis, and by letting the connection between the mount on the headpiece and the mount of the support as well as the connection between the extension of the headpiece and the drive of the support be detachable connections which form the sole structural connections between the headpiece and the support. Consequently, the support may be used in conjunction with any one of a plurality of headpieces each of which may, by establishing and breaking the two connections, as required, be interchanged for another headpiece.

According to a preferred embodiment of the invention, the drive means comprises a spindle, a spindle nut arranged on the spindle for axial movement relative thereto upon rotation of the spindle, and two trunnions on the nut and extending parallel to the pivot axis. The headpiece has two extensions each carrying a respective mounting for receiving a respective one of the trunnions.

BRIEF DESCRIPTION OF THE DRAWINGS

FIG. 1 is a side view of a support which constitutes one of the two units of an automatic production machine according to the present invention.

FIG. 2 is a side view of the support of FIG. 1 and additionally shows the same carrying a headpiece which forms the other unit of an automatic production machine according to the present invention. FIG. 2 additionally shows, in exploded view, two further headpieces which may be interchanged for the headpiece which the support is depicted as carrying.

FIG. 3 is an end view of the structures illustrated in FIG. 2 and shows the support carrying one of the three headpieces of FIG. 2. The two other headpieces are likewise illustrated.

DETAILED DESCRIPTION OF THE PREFERRED EMBODIMENTS

Figure 4:
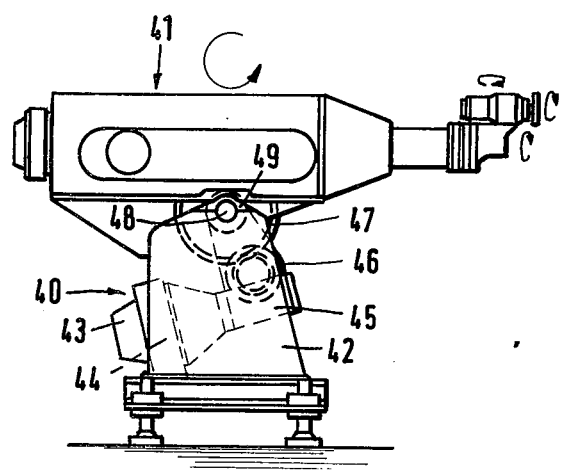
FIG. 4 is a side view of another embodiment of the present invention and shows the support as well as a headpiece carried thereby.

Referring now to the drawings and first to FIG. 1 thereof, the same shows a support indicated generally at 1, which, in the illustrated embodiment, is composed of a stationary pedestal 2 carrying a turret 5. The latter is rotatable about an axis 4 as indicated by the arrows 3, the axis 4 being, for example, vertically oriented. The turret 5 carries two parallel, spaced-apart side walls 6 and 7, best shown in FIG. 3 which likewise depicts these side walls as being provided with suitable reinforcing webs. The upper end surfaces 8, 9 of the side walls 6, 7 are horizontally aligned, i.e., they lie at the same level defined by a generally horizontal plane, and are provided with aligned, semi-circular groove-like recesses 10, 11 adapted to receive the pivot axles of a headpiece that is placed on the support. The headpiece is not depicted in FIG. 1 but is indicated generally at 12 in FIGS. 2 and 3. The pivot axis about which the headpiece 12 can turn is transverse and is indicated at 13, the physical structure affording pivoting comprising, for example, two short shafts or trunnions attached to extensions 14, 15 of the headpiece 12. As shown in the lower part of FIG. 2, the extensions 14, 15 are approximately triangular and project into the support 1 such that the trunnions are received by the recesses 10, 11 and the downwardly pointing apex regions of the extensions 14, 15 extend as far as the drive mechanism by means of which the headpiece is pivoted about the axis 13. This drive mechanism is, as shown in FIG. 1, arranged in the support 1 so that a single drive mechanism is all that is required irrespective of the number of individual headpieces which may be used in conjunction with the support 1.

In the illustrated embodiment, the drive mechanism for pivoting the headpiece comprises a motor 16, such as a disc-rotor motor, a spindle 17 which is rotated by the motor, and a spindle nut 18 which is provided with two short shafts 19, 20 which extend from opposite sides of the nut 18 and serve as trunnions, as will be explained below. These trunnions are parallel to the pivot axis 13 and to the axes of the two recesses 10, 11 for receiving the trunnions constituting the pivot axle of the headpiece 12. As shown in FIG. 3, the side walls 6, 7 are provided with openings 21, 22 through which the trunnions 19, 20 can be inserted and removed, suitable pins or dowels 23, 24 being provided for positioning and securing the trunnions 19, 20 in the regions of the lower ends of the downwardly pointing apex regions of the extensions 14, 15.

The extensions 14, 15 are provided with eye-shaped mountings 25, 26 forming openings within which the trunnions 19, 20 are rotatably received. Thus, when, upon actuation of the drive mechanism, the spindle 17 is rotated which thereby axially displaces the nut 18, the headpiece 12 that has been placed on the support 1 will be pivoted about the pivot axis, as indicated by the double-arrow 27. This pivotal movement will be accompanied by a small change in the elevation of the mountings 25, 26, and to allow for this, the pivot drive 16, 17, 18 is itself mounted for pivotal movement relative to the support 1 about a horizontal transverse axis indicated at 28. This pivotal mounting allows that portion of the drive mechanism which lies to the right of the pivot axis 28, as viewed in FIGS. 1 and 2, to move up and down as the spindle nut 18 is displaced in the direction shown by the double-arrow 29.

It will be seen from the above that such headpiece 12 as is mounted on the support 1 at any given time can easily be disconnected from the support. The same applies to the parts forming the pivot axis 13, in that bridge-like parts 30, 31 are provided which, when the headpiece is mounted on the support 1, overlie and complement the recesses so as to form closed bearings for the pivot axles of the headpiece. In practice, the parts 30, 31 may be screwed or bolted to the side walls 6, 7 so as to be held firmly in place when a headpiece is carried by the support.

It will thus be seen that all that needs to be done to exchange any one headpiece for another, other than disconnecting and reconnecting such electrical, hydraulic and/or pneumatic lines (not shown) as may run between the support and the headpiece, is to remove the connections between the spindle nut 18 and the extensions of the headpiece as well as the connections between the bridge-like parts 30, 31 associated with the bearings for the pivot axis 13 and, after a different headpiece has been put in place, to reestablish these connections. This is so because the connection between the mounting parts on the headpiece and the mounting parts on the support as well as the connection between the extensions of the headpiece and the drive mechanism of the support with which the extensions coact, are detachable connections and form the sole structural connections between the headpiece and the support. The term "structural connection," in this context and as used in the claims, is intended to refer to the mechanical connections by which the headpiece and support are connected together for support and movement, and it does not include such electrical, hydraulic and/or pneumatic lines, referred to above, as may be provided between the support and the headpiece.

FIGS. 2 and 3 show the above-described exchangeability by way of an exploded illustration of two additional headpieces 32 and 33. The latter are depicted as having trunnions 34, 35, respectively, as well as extension 36, 37, respectively, which are provided with eye-shaped mountings 38, 39, respectively, that form openings for receiving the trunnions. When the respective headpieces are mounted on the support 1, their trunnions come to lie in the recesses 10, 11 and their extensions 36, 37 extend into the support such that their mountings 38, 39 are aligned with the axis of the trunnions 19 and 20.

It will be appreciated that, in practice, the headpieces can be completely different types of machine components, provided only that they have the above-described parts which allow each individual headpiece to be physically attached to the support, i.e., the support may be used in conjunction with any one of a plurality of headpieces designed to carry out different operations, each of which headpiece may, by establishing and breaking the two connections, as required, be interchanged for another headpiece. Thus, the headpiece 12, which is the one shown as being connected to the support 1 in FIGS. 2 and 3, is shown as being a unit which, at the right-hand end as viewed in the drawings, is provided with a three-axis transmission which can be pivoted as indicated by the arrows, the mechanism additionally being capable of linear displacement. The headpiece 32 is a unit shown as being a linearly displacement mechanism having rotatable grippers at the right-hand end. Finally, the headpiece 33 is an articulated arm unit whose right-hand end is adapted to carry a work tool and which can be moved in the directions shown by the arrows.

The above-described structure can be modified in such a way as to make it unnecessary for the drive mechanism 16, 17, 18 to be mounted for pivotal movement about the axis 28. This can be done by providing the extensions 14, 15 of the headpiece 12—and, comparably, the extensions 36, 37 of the headpieces 32, 33, respectively—with downwardly opening slit-shaped or U-shaped, generally fork-shaped recesses which take the place of the openings of the eye-shaped mountings 25, 26 described above. This allows the spindle nut 18 and the extensions of the headpiece to be mechanically coupled in such a way as to effect the pivoting of the latter while allowing the parts to be elevationally displaced with respect to each other.

FIG. 4 shows still another way in which to construct the pivoting mechanism so as to make it unnecessary for it to be pivotably mounted. Here, the pivot drive mechanism 40, intended for use with the headpiece 41 as well as with other headpieces (not shown) which, while designed to perform different operations, are of similar construction insofar as their connection to the support is concerned, is arranged in the support 42 and comprises a drive motor 43—which, here, too, may be a disc-rotor motor—a sun-gear arrangement 44 known as epicyclic drive, a worm 45 and a toothed worm gear 46, the upper reach of the latter, which is directed toward the extension of a headpiece mounted on the support, being open and freely accessible. The headpiece 41 is shown as being provided with at least one extension which is configured as toothed gear sector 47, the axis of the latter coinciding with that of the pivot axis 48 for the headpiece 41. The mechanical parts which afford the pivoting motion may include bridge-like parts which, as described above in connection with the embodiment of FIGS. 1 to 3, are detachably connectible to the side walls of the support 42. Only one such part is depicted in FIG. 4 at 49. The dimensioning and arrangement of the parts is such that when the headpiece 41 is inserted from the top so that the parts constituting the pivot axis 48 come to lie in the bearing recesses of the side walls of the support 42, the gear sector 47 will mesh with the toothed worm gear 46.

It will be appreciated that it is simple indeed to exchange one headpiece 41 for another, as all that is required, other than to disconnect and reconnect any electrical, hydraulic and/or pneumatic lines, is to unscrew or unbolt, and then re-screw or re-bolt the bridge-like parts associated with the bearing recesses. The mechanical connection between the gear sector 47 and the worm gear 46 is effected automatically without it being necessary to undo or secure any connectors.

It will be understood that the above description of the present invention is susceptible to various modifications, changes and adaptations, and the same are intended to be comprehended within the meaning and range of equivalents of the appended claims.

For example, while the illustrated embodiments show the axis about which the turret 5 rotates to be a generally vertical axis, the base of the support may be attached to an inclined base place or to an inclined frame, so that the turret is rotatable about a non-vertical axis.

What is claimed is:

1. In an automatic production machine having a headpiece that is adapted to hold a workpiece and/or a work tool and a support for carrying the headpiece, the improvement that
   (a) said headpiece and said support are self-contained units which are independent of each other,
   (b) said support comprises
      (1) mounting means for supporting said headpiece for pivotal movement with respect to said support means about a transverse pivot axis and
      (2) drive means for pivoting said headpiece when the same is pivotably supported by said support, said drive means comprising a spindle, a spindle nut arranged on said spindle for axial movement relative thereto upon rotation of said spindle, and two trunnions on said nut and extending parallel to said pivot axis,
   (c) said headpiece comprises
      (1) mounting means capable of being pivotably received by said mounting means of said support, and
      (2) two extensions which, when said headpiece is pivotably supported by said support, extend into said support, each extension carrying a respective mounting for receiving a respective one of said trunnions, said extensions and the mountings carried thereby coacting with said drive means such that upon actuation of the latter, said headpiece is pivoted about said transverse pivot axis, and
   (d) the connection between said mounting means of said headpiece and said mounting means of said support as well as the connection between said extension of said headpiece and said drive means of said support are detachable connections and form the sole structural connections between said headpiece and said support, in consequence of which said support may be used in conjunction with any one of a plurality of headpieces each of which may, by establishing and breaking the two connections, as required, be interchanged for another headpiece.

2. The improvement defined in claim 1, wherein said support has two side walls which have upper surfaces that lie at the same level, said side walls being provided with aligned recesses which form said mounting means of said support and receive said mounting means of said headpiece, and wherein said connection between said mounting means of said headpiece and said mounting means of said support include bridge-like parts that are detachably connected to said side walls and that complement said recesses to form bearing seats.

3. The improvement defined in claim 1, wherein said trunnions are arranged so as to be detachable and attachable in the direction of their axis.

4. The improvement defined in claim 3, wherein said mountings on said two extensions of said headpiece have openings for receiving said trunnions, and wherein said spindle is, in the region of one of its ends, mounted for pivotable movement about a further pivot axis which is parallel to the first-mentioned pivot axis.

* * * * *